US008186902B2

(12) United States Patent
Lee et al.

(10) Patent No.: US 8,186,902 B2
(45) Date of Patent: May 29, 2012

(54) MEANS FOR DISABLING A SAFETY CATCH ON A SCREW-THREADED COMPONENT

(75) Inventors: Alan Sian Ghee Lee, Singapore (SG); Henry Greaves, Watsons Bay (AU)

(73) Assignee: Alan Sian Ghee Lee, Singapore (SG)

( * ) Notice: Subject to any disclaimer, the term of this patent is extended or adjusted under 35 U.S.C. 154(b) by 630 days.

(21) Appl. No.: 12/298,288

(22) PCT Filed: Apr. 24, 2007

(86) PCT No.: PCT/AU2007/000529
§ 371 (c)(1), (2), (4) Date: Dec. 11, 2008

(87) PCT Pub. No.: WO2007/121529
PCT Pub. Date: Nov. 1, 2007

(65) Prior Publication Data
US 2009/0199494 A1  Aug. 13, 2009

(30) Foreign Application Priority Data
Apr. 26, 2006 (AU) ............................... 2006902151

(51) Int. Cl.
*B25G 3/00* (2006.01)
(52) U.S. Cl. ....... 403/315; 403/21; 403/322.4; 411/911; 52/126.6
(58) Field of Classification Search .................. 403/318, 403/21, 315, 118, 322.4; 411/326, 329, 949, 411/950, 951, 911; 81/DIG. 8, 176.1, 119, 81/46, 85, 486, 9.3 N, 9.3; 138/96 R, 96 T; 52/126.6
See application file for complete search history.

(56) References Cited

U.S. PATENT DOCUMENTS

| | | | | |
|---|---|---|---|---|
| 1,722,541 A | * | 7/1929 | Rossetti | 411/327 |
| 3,224,800 A | * | 12/1965 | Fisher | 403/118 |
| 4,863,328 A | * | 9/1989 | Malek | 411/114 |

(Continued)

FOREIGN PATENT DOCUMENTS
JP  07-279373  10/1995
(Continued)

*Primary Examiner* — Daniel P. Stodola
*Assistant Examiner* — Matthew R. McMahon

(57) ABSTRACT

A disabling tab (100) for disabling an anti-disengagement or safety catch (80) such as on a connector (20) of a pedestal for elevated floors having mating internally and externally threaded components is disclosed. The safety catch (80) is a pivoted wedge shaped block defined at the lower end of an externally threaded component which defines a ramped portion (84) extending to a buttress end (86) facing the start of the external thread. In the internally threaded components, one thread also defines a buttress end (92). When the components are screwed together, the ramp (84) of the safety catch deflects inwards and passes the buttress end (92). When the components are unscrewed, the end (86) of the catch abuts the end (92) of the thread preventing the components from being unscrewed. The tab (100) includes a v-shaped end portion (106) comprising two arms—a thin ramped bridge portion (110) which in use fits over, the safety catch (80), and a second arm 108 which locates between the threads at the start of the thread of the externally threaded component. A shaft (100) extends away from end portion (106). In use, the bridge portion (110) disables the safety catch by guiding the buttress end (92) of the internal thread over the safety catch (80) while deflecting the safety catch inwards. The arms (110, 108) of the bridge portion are thin enough to pass between the external and internal threads without jamming.

8 Claims, 5 Drawing Sheets

U.S. PATENT DOCUMENTS

| | | | |
|---|---|---|---|
| 5,713,708 A * | 2/1998 | Van derDrift et al. | 411/208 |
| 5,768,727 A * | 6/1998 | Brainerd | 81/20 |
| 5,850,650 A * | 12/1998 | Karsnia | 7/146 |
| 6,332,292 B1 * | 12/2001 | Buzon | 52/126.6 |
| 6,360,637 B1 * | 3/2002 | Weinraub | 81/488 |
| 6,442,906 B1 | 9/2002 | Hwang | |
| 2004/0047709 A1 * | 3/2004 | DiStasio et al. | 411/329 |

FOREIGN PATENT DOCUMENTS

| | | |
|---|---|---|
| WO | WO 91/02867 | 3/1991 |

\* cited by examiner

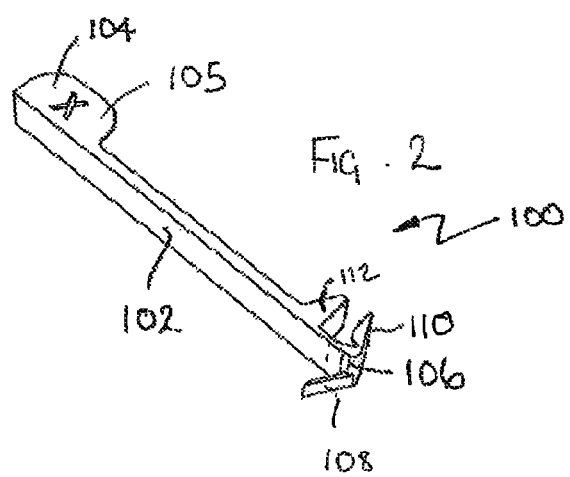
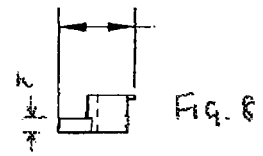
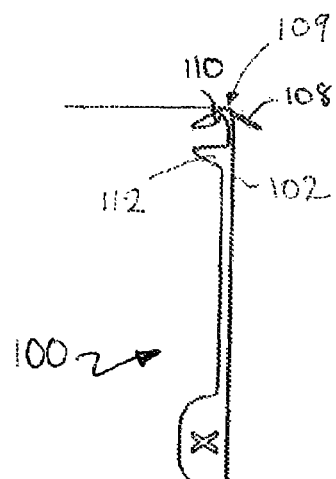
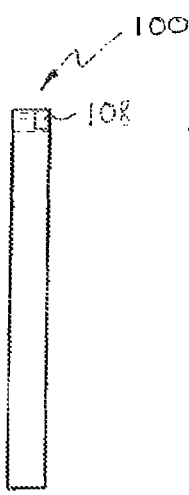
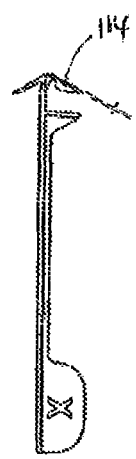
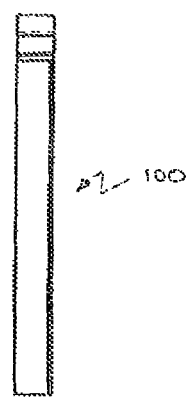
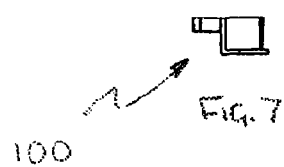

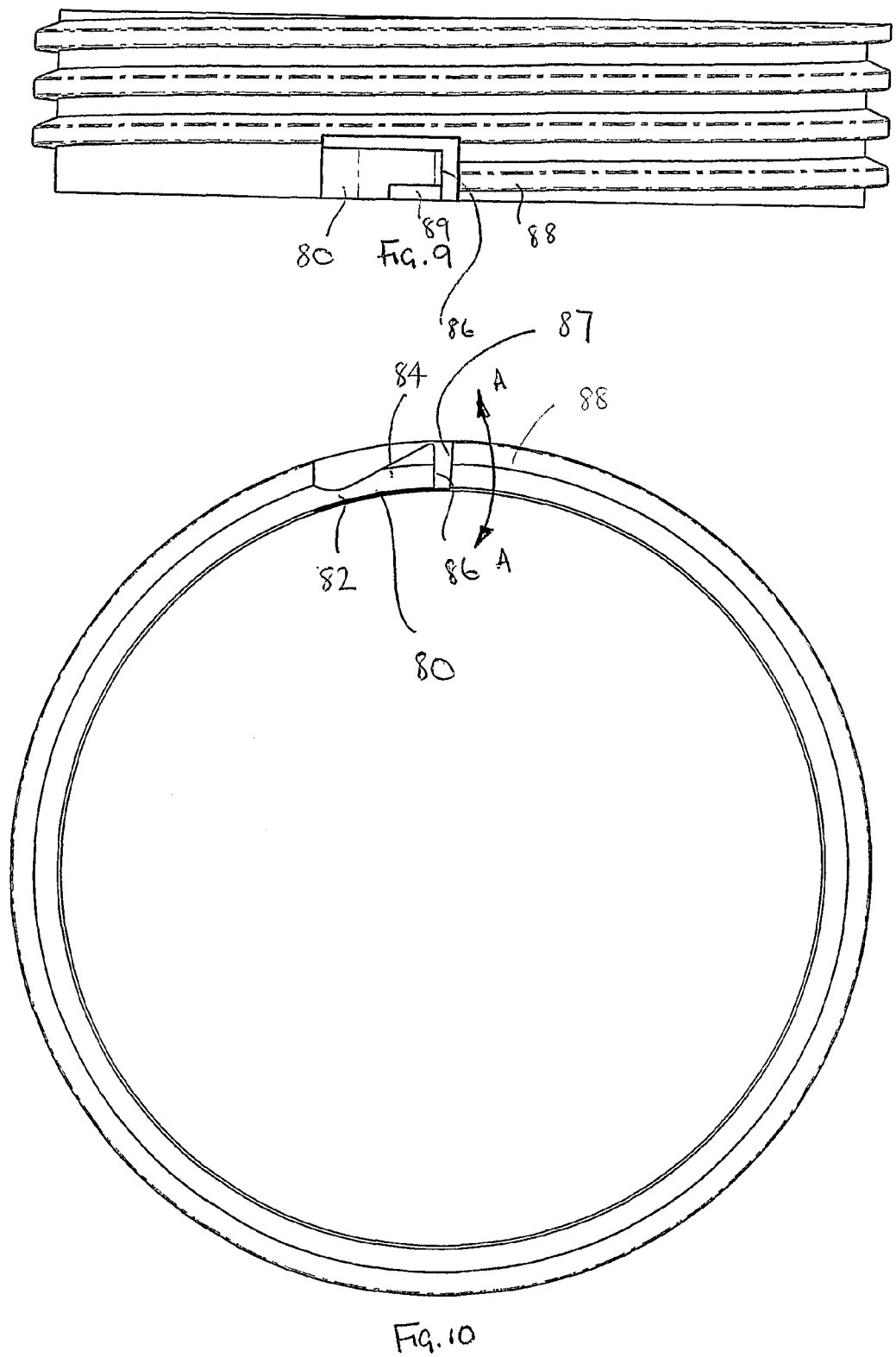

MEANS FOR DISABLING A SAFETY CATCH ON A SCREW-THREADED COMPONENT

CROSS-REFERENCE TO RELATED APPLICATIONS

The present application claims priority from Australian Provisional Patent Application No 2006902151 filed on 26 Apr. 2006, the content of which is incorporated herein by reference.

FIELD OF THE INVENTION

This invention relates to a means for disabling a safety catch on a screw-threaded component. In particular, it relates to a means for disabling a safety catch provided on a connector extender or head of a pedestal for elevated floors. However it may have applications where safety catches are used to prevent disengagement of other screw threaded components.

BACKGROUND OF THE INVENTION

It is known to provide elevated or raised floors, also known as pedestal floors. Elevated flooring incorporates a number of height adjustable pedestals also known as pedestal jacks which are uniformly distributed over a sub-surface/sub-floor such as a concrete floor of a multi-storey building, a roof, terrace, or any other surface on top of which it is desired to locate an elevated floor. The pedestals cooperate in supporting floor panels, such as pavers, or other floor surfaces.

Pedestal jacks include a base, which includes a base plate on which the pedestal jack stands in use, and an annular cylindrical portion which extends upwards from the base and which is internally threaded. A connector element which is also annular and is internally and externally threaded is screwed into the base. A head portion incorporating a slope corrector also defines a depending annular portion which is externally threaded and is screwed into the connector. For a typical pedestal jack the three components may be screwed out to a height of approximately 150 mm. It is possible to increase the height of the unit by unscrewing the head and screwing in one or more extenders. Each extender will have a lower threaded portion which is configured to screw into the connector and an upper internally threaded annular portion into which the threaded portion of the head or another extender, may be screwed.

For safety reasons to ensure sufficient engagement of the various components due to their load bearing nature, and also to prevent the assembled units completely disengaging once installed, a safety catch is provided at the base of the externally threaded portions of the head, connector and extender, which co-operates with the internal threads of the component into which it is screwed to ensure that once assembled neither the head, extender nor connector can be disengaged from that, and ensures that at least three threads of each unit are engaged with that component. The safety catch is a pivoted wedge shaped block which defines a buttress-like face facing the start of the external thread.

In the internally threaded (female) components, the internal threads are discontinuous. The top three threads have relatively shallow ramped ends which allow the catch to deflect inwards whether being screwed clockwise or anti-clockwise. However the start of the lowermost thread defines a non-ramped buttress-like vertical face, which is substantially perpendicular to the internal circumference of the component adjacent a hole. When the components are screwed together the ramp of the safety catch deflects inwards and passes the buttress end. However when the components are subsequently unscrewed the face of the catch abuts the vertical buttress end of the thread preventing the components from being unscrewed further. The catch may be depressed by pushing a matchstick through the hole but this is fiddly and may damage the safety catch.

The components of pedestal jacks are relatively voluminous and thus can incur high shipping costs. Shipping costs could be reduced if the components of the pedestal jacks were screwed together for shipping. It is envisaged that a base connector and head unit could be screwed together, and a plurality of extenders could also be screwed together separately. However, the problem with this approach would be that it would be relatively fiddly and time consuming to disassemble the units at their destination due to the safety catches.

The present invention seeks to alleviate the above mentioned disadvantages.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first broad aspect, the present invention provides a disabling tab for disabling a safety catch defining a hinge and a face for engaging a buttress end of a internal thread, the disabling tab including a relatively thin bridging portion adapted to span the safety catch and a means for locating the bridging portion across the catch.

More specifically, the present invention provides a disabling tab for disabling a safety catch on a threaded component, the catch defining a hinge and a face for engaging a buttress end of an internal thread, the face being disposed adjacent a start of a thread and separated therefrom by a gap, the disabling tab including a bridging portion adapted to at least partly cover the catch and span the gap between the buttress end and the start of the thread, in use, and a means for locating the tab in position.

Typically the tab defines a thin ramped bridge portion which in use fits over the safety catch, and includes a thin narrow portion which locates between the threads at the start of the thread of the externally threaded component, and a portion for retaining the bridge in position. A shaft arm may extend away from the bridging portion generally perpendicular to the same. In use, the bridging portion disables the safety catch by guiding the buttress end of the external thread over the safety catch deflecting the safety catch inwards and allowing the buttress to pass over the safety catch. The bridging portion is thin enough to pass between the external and internal threads without jamming.

Because the bridging portion fits between two threads of the Male element, and the female thread has to pass over the top of it, it needs to be relatively thin to prevent jamming of the two components and typically has a thickness of less than 0.5 mm and preferably a thickness of around 0.4 mm. The disabling tab is typically made from a plastics material such as polypropylene.

Typically, the tab will include an elongate arm extending away from the bridging portion in a generally perpendicular direction.

The present invention also provides a combination of a threaded component having a safety catch and a tab.

More specifically, in a related aspect there is provided a combination of an externally threaded component having a safety catch in the form of a hinged flap and a face for engaging a buttress end of an internal thread, the face being disposed adjacent a start of the thread of the component and separated therefrom by a gap; and a disabling tab including a bridging portion at least partly covering the hinged flap and spanning the gap between the face and the start of the thread.

BRIEF DESCRIPTION OF THE DRAWINGS

A specific embodiment of the present invention will now be described, by way of example only, and with reference to the accompanying drawings in which:

FIG. 2 is a perspective view of an embodiment of a safety catch disabling tab;

FIG. 3 is a top plan view of the tab of FIG. 2;

FIG. 4 is a side view of the tab of FIG. 2;

FIG. 5 is a bottom plan view of the tab of FIG. 2;

FIG. 6 is a side view of the tab from the opposite side to that of FIG. 4;

FIG. 7 is a rear end view of the tab;

FIG. 8 is a front end view of the tab;

FIG. 9 is a side elevation of the lower part of the external (male) thread of a component of the pedestal jack, illustrating the safety catch;

FIG. 10 is an underneath plan view of the component of FIG. 9 illustrating the safety catch;

DETAILED DESCRIPTION OF PREFERRED EMBODIMENTS

Figure 1:
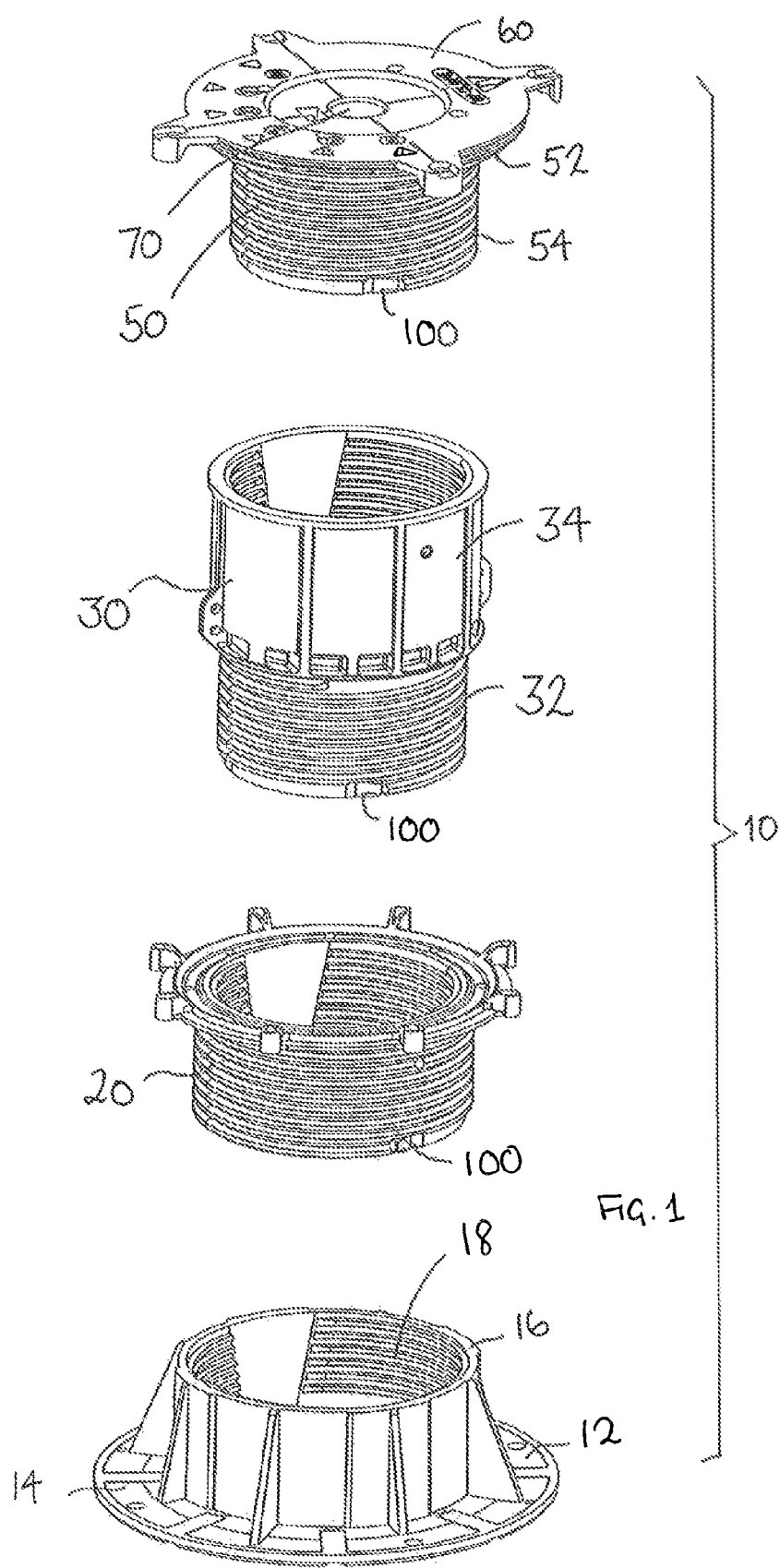
FIG. 1 is an exploded view of components of a pedestal jack.
Figure 11:
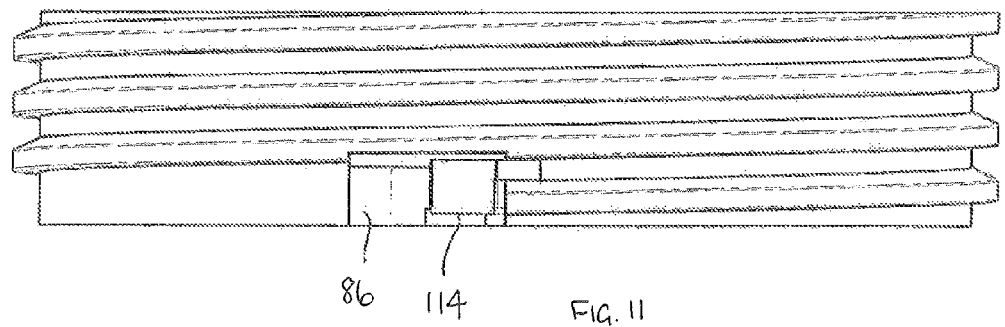
FIG. 11 is a side elevation of the lower part of the external (male) thread of a component of the pedestal jack showing the disabling tab in position.

Referring to the drawings, FIG. 1 shows height adjustable pedestal 10 incorporating slope adjustment comprising a number of components. As shown, the height adjustable pedestal comprises a base element 12, having a circular planar base plate 14 defining a plane on which the pedestal stands in use, and an annular cylindrical portion 16 extending upwards from the base. The annular portion 16 is internally (female) threaded defining six internal threads 18. Spaced above the base 12 is a connector 20 which has an annular cross section and is internally and externally (male) threaded. The externally threaded portion locates in the base 16. Located above the connector 20 is an extender 30 which has a generally annular cross section comprising a lower portion 32 which is externally threaded and configured to locate inside the connecter 20 and an upper, larger diameter portion 34 which is internally threaded. A head portion 50 includes an upper portion 52 and a depending externally threaded cylindrical portion 54. A slope compensator plate 60 locates on top of the upper portion of the head portion 50. A cruciform paver separator (not shown) may snap fit into an aperture 70 in the upper portion of the slope adjustor plate.

With reference to FIGS. 9 and 10, at the base of each of the externally threaded portions on the connector, extender, and head portion, there is a safety catch 80. In plan view (see FIG. 10), the safety catch is generally triangular having a hinge portion 82 at one end where it is joined to the component, a ramped portion 84 and an end face 86, on the opposite side to the hinge 82, and which faces the start 87 of the external thread 88, separated therefrom by a gap. The safety catch may pivot about the hinge 82, in the direction of the arrows A-A shown in FIG. 10. A small rectangular recessed portion 89 is defined at the base of the ramped portion adjacent the end 86.

Figure 13:
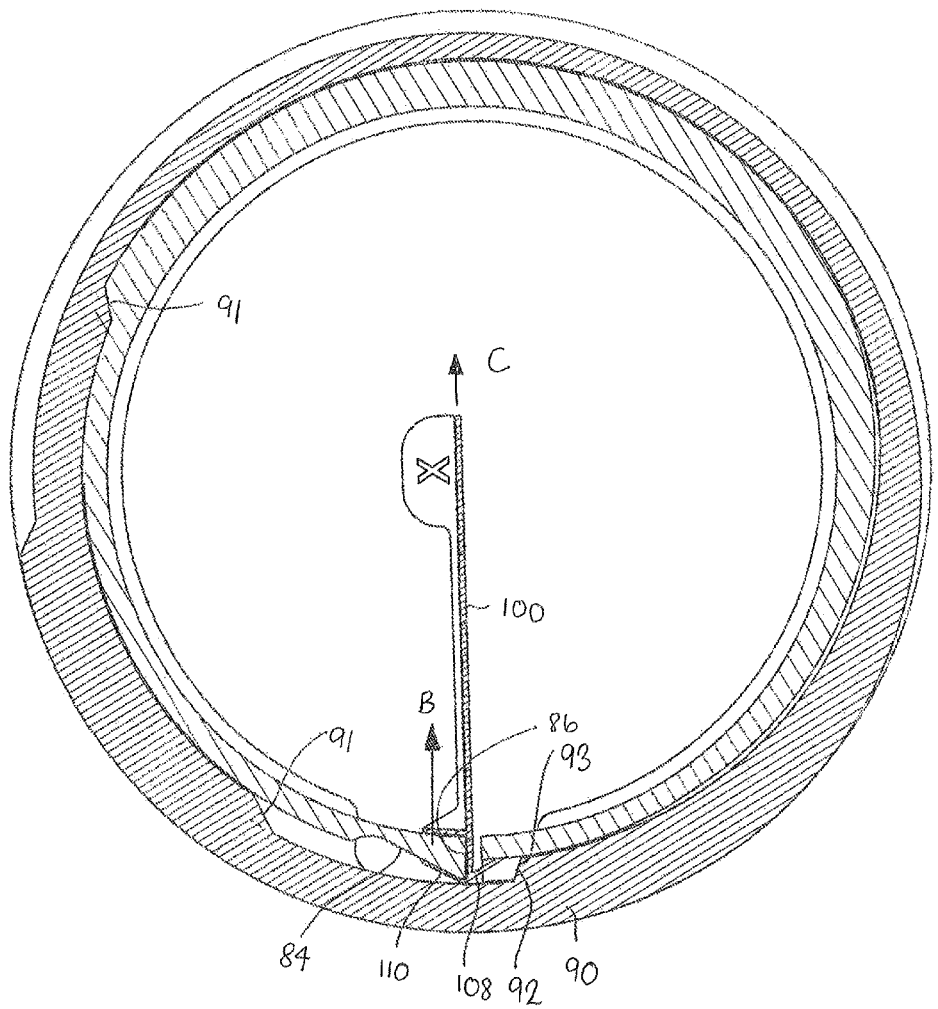
FIG. 13 is a cross-section, viewed from below, showing the lower part of an external thread of a pedestal component, with the tab in place, and the internal (female) thread illustrating an unscrew prevention buttress end.

With reference to FIG. 13, in the internally threaded (female) components 90 the internal threads are discontinuous. The top three threads have relatively gently sloping ramped ends 91 which allow the safety catch 80 on an externally threaded component to deflect inwards whether being screwed clockwise or anti-clockwise. However the start 92 of the lowermost thread defines a non-ramped, steep buttress-like vertical face in the form of a buttress end 93, which is almost perpendicular to the internal circumference of the component. When the components are screwed together, with the internal component turning in a clockwise sense, the ramp 84 of the safety catch deflects inwards and passes the ramped ends 91 and buttress end 93. However when the components are subsequently unscrewed the end face 86 of the catch abuts the vertical buttress end 93 of the thread preventing the components from being unscrewed further. To release the catch it is necessary to deflect the catch 80 inwards in the direction of the arrow B.

FIGS. 2 to 8 illustrate a disabling tab 100 for disabling the safety catch 80. The tab includes an elongate shaft 102 having a proximal end 104 which defines a planar grip portion 105 with an "X" shaped aperture cut into it to assist in gripping the tab and a distal end 106 which provides a safety catch disabling function.

In plan view as shown in FIG. 3, the distal end of the device defines a bridging portion in the form of a shallow "v" shaped element 106 formed from two arms 108 and 110 joined at an apex 109. Both arms are thin and relatively flexible and in particular, bend and flex both along their length and also hinge/flex particularly at the apex 109 where they join the shaft 102.

The shallow v-shaped element 106 is the means by which the safety catch is disabled as will be described below. The other features of the distal end include a side arm 112 and a projection 114. Essentially the function of those other elements is to locate and retain the tab 100 in position. In particular, in use (see FIG. 12 or 13) the free end of the catch 80 locates between the side arm 112 and arm 110 and the projection 114 locates in the recess 89 of the catch.

The arm 108 is approximately 0.4 mm thick and its height h (refer to FIG. 8) is approximately the same as or marginally smaller than the distance between two adjacent external threads. The arm 110 is also 0.4 mm thick.

Figure 12:
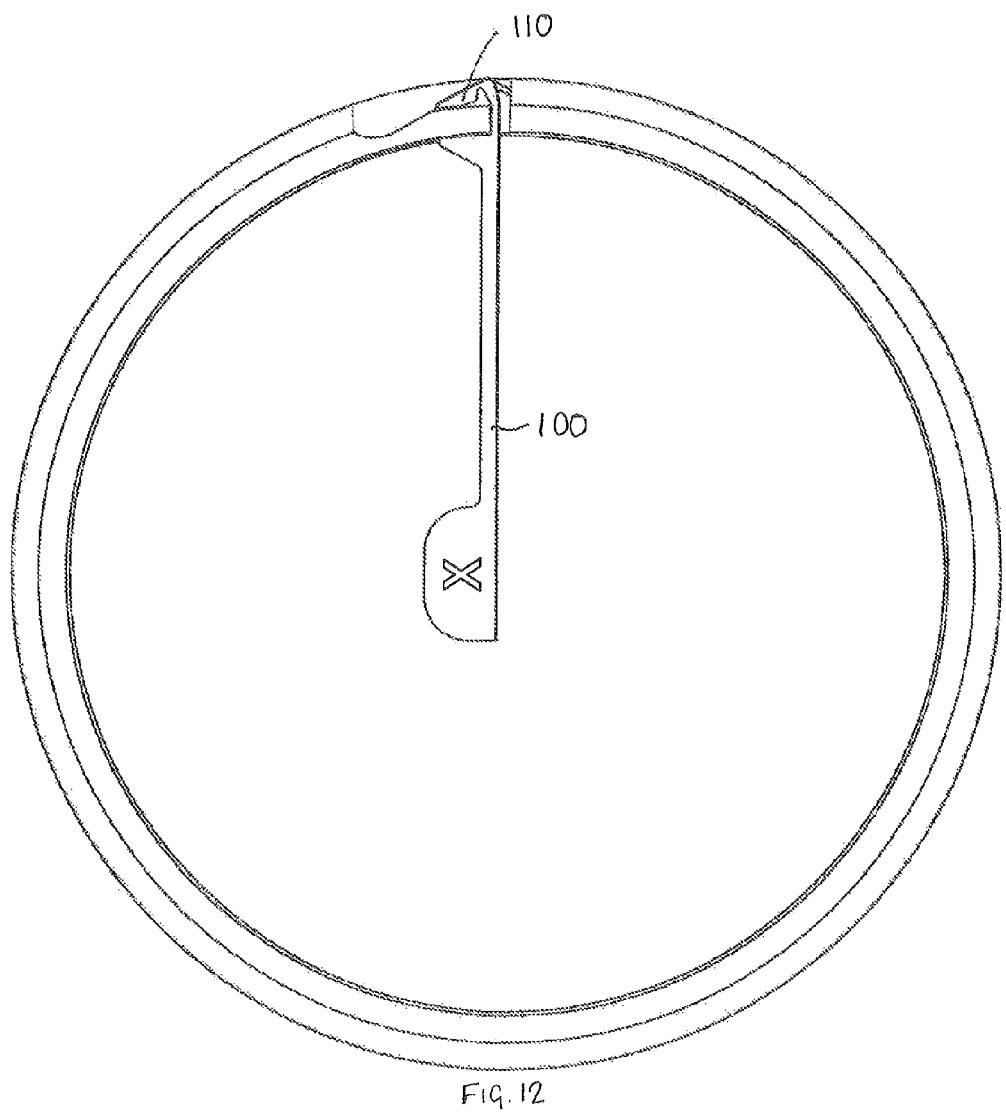
FIG. 12 is a top plan view of the lower part of the external (male) thread of a component of the pedestal jack again showing the disabling tab in position.

In use, with reference to FIGS. 12 and 13, the tab 100 is installed over the safety catch as shown, with the arm 110 located over the ramped portion 84 of the safety catch and the arm 108 bridging the gap between the end 86 of the catch and the start of the external thread. The components of the height adjustable pedestal may be screwed together as normal. Typically, a base element 12, connector 20 and head portion 50 could be screwed together, and a plurality of extenders 30 could also be screwed together separately. There is typically about 0.5 mm clearance between the male and female threads to the thin (0.4 mm thick) arms 108 and 110 do not cause the threads to jam. The v-shaped arms 108 and 110 bridge the gap between the end face of the catch and the start of the external (male) thread. When the components are to be unscrewed, as the face 86 of the catch approaches the buttress end 93, in the direction of the arrow D, the arm 108 guides the buttress end 93 smoothly over the catch 86 and pushes the catch inwards in the direction of the arrow B, as the buttress end 93 rides over the arms 108 and 110.

Once the components have been separated the disabling tab can be easily removed and discarded by pulling the tab 100 in the direction of the arrow C, which causes the arms 108, 110 to deform/flex away from the arm 10' and be pulled through the gap between the face 86 and the start 87 of the external thread.

Note that although the present invention is described in relation to unscrewing pedestal jacks the invention is not limited to use with pedestal jacks and may have applications where similar safety catches are used to prevent disengagement of other screw threaded components for the temporary disablement of such catches.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A combination of an externally threaded component having a safety catch and a disabling tab, comprising:

the safety catch of the externally threaded component having a hinged flap and a face for engaging a buttress end of an internal thread of an internally threaded component, the face being disposed adjacent a start of an external thread of the externally threaded component and separated therefrom by a gap, the disabling tab including a flexible bridging portion at least partly covering the hinged flap and spanning the gap between the face of the catch and start of the external thread of the externally threaded component, the bridging portion having a first arm which fits over the hinged flap, and a second arm, of lesser height than the first arm, located between the face of the catch and the start of the external thread, at the start of the external thread of the externally threaded component, including a shaft extending from the bridging portion, towards the interior of the externally threaded component, wherein the first arm extends from a first side of the shaft and the second arm extends from a second side of the shaft, opposite to the first side a side arm extending from the first side of the shaft and spaced from the first arm, wherein a free end of the safety catch is located between the first arm and the side arm.

2. A combination as claimed in claim 1 wherein the first and second arms join at a y-shaped apex.

3. A combination as claimed in claim 1 further including a grip defined at an opposite end of the shaft to the bridging portion.

4. A combination as claimed in claim 1 wherein the bridging portion has a thickness around 0.4 mm.

5. A combination as claimed in claim 1 wherein the disabling tab is made from a plastic material.

6. A combination as claimed in claim 5 wherein the plastics material is polypropylene.

7. A combination as claimed in claim 1 wherein the externally threaded component is a component of a pedestal jack.

8. A combination of an externally threaded component having a safety catch and a disabling tab comprising:

the safety catch of the externally threaded component having a hinged flap and a face for engaging a buttress end of an internal thread of an internally threaded component, the face being disposed adjacent a start of an external thread of the externally threaded component and separated therefrom by a gap, the disabling tab including a flexible bridging portion at least partly covering the hinged flap and spanning the gap between the face of the catch and start of the external thread of the externally threaded component, the bridging portion having a first arm which fits over the hinged flap, and a second arm, of lesser height than the first arm, located between the face of the catch and the start of the external thread, at the start of the external thread of the externally threaded component, including a shaft extending from the bridging portion towards the interior of the externally threaded component, wherein the first arm extends from a first side of the shaft and the second arm extends from a second side of the shaft, opposite to the first side, a side arm extending from the first side of the shaft and spaced from the first arm, and a grip defined at the opposite end of the shaft to the bridging portion, the disabling tab being made from a plastic material and the bridging portion of the tab having a thickness of less than 0.5 mm.

* * * * *